(12) United States Patent
Andrade et al.

(10) Patent No.: US 9,135,069 B2
(45) Date of Patent: *Sep. 15, 2015

(54) APPLICATION RESOURCE MODEL COMPOSITION FROM CONSTITUENT COMPONENTS

(75) Inventors: Henrique Andrade, Croton-on-Hudson, NY (US); Bugra Gedik, White Plains, NY (US); Sujay Sunil Parekh, Dobbs Ferry, NY (US); Kun-Lung Wu, Yorktown Heights, NY (US); Xiaolan Zhang, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 13/464,386

(22) Filed: May 4, 2012

(65) Prior Publication Data
US 2012/0297391 A1 Nov. 22, 2012

Related U.S. Application Data

(63) Continuation of application No. 12/466,017, filed on May 14, 2009, now Pat. No. 8,255,554.

(51) Int. Cl.
*G06F 15/16* (2006.01)
*G06F 9/44* (2006.01)
(Continued)

(52) U.S. Cl.
CPC .......... *G06F 9/5011* (2013.01); *H04L 41/5035* (2013.01)

(58) Field of Classification Search
CPC .......................... G06F 9/5011; H04L 41/5035

USPC ................................... 709/231; 717/120, 133
See application file for complete search history.

(56) References Cited

U.S. PATENT DOCUMENTS

| 7,693,983 | B1 * | 4/2010 | Gupta et al. ................. 709/224 |
| 7,908,369 | B2 | 3/2011 | Truong et al. |

(Continued)

OTHER PUBLICATIONS

Li et al., Enabling dynamic composition and coordination for autonomic grid applications using the rudder agent framework. Knowledge Engineering Review, vol. 00:0, 1-15, 2006.

(Continued)

*Primary Examiner* — Joe Chacko
(74) *Attorney, Agent, or Firm* — Ryan, Mason & Lewis, LLP (57) ABSTRACT

Techniques for composing an application resource model are disclosed. The techniques include obtaining operator-level metrics from an execution of a data stream processing application according to a first configuration, wherein the application is executed by nodes of the data stream processing system and the application includes processing elements comprised of multiple operators, wherein two or more of the operators are combined in a first combination to form a processing element according to the first configuration, generating operator-level resource functions from the first combination of operators based on the obtained operator-level metrics, and generating a processing element-level resource function using the generated operator-level resource functions to predict a model for the processing element formed by a second combination of operators, the processing element-level resource function representing an application resource model usable for predicting characteristics of the application executed according to a second configuration.

19 Claims, 5 Drawing Sheets

(51) Int. Cl.
*G06F 9/50* (2006.01)
*H04L 12/24* (2006.01)

(56) References Cited

U.S. PATENT DOCUMENTS

| | | | |
|---|---|---|---|
| 8,102,836 B2 | 1/2012 | Jerlhagen et al. | |
| 2002/0152305 A1* | 10/2002 | Jackson et al. | 709/224 |
| 2003/0225876 A1 | 12/2003 | Oliver et al. | |
| 2007/0261041 A1 | 11/2007 | Amini et al. | |
| 2007/0299980 A1* | 12/2007 | Amini et al. | 709/231 |
| 2008/0134158 A1* | 6/2008 | Salz et al. | 717/148 |
| 2008/0235685 A1 | 9/2008 | Amini et al. | |
| 2008/0256253 A1* | 10/2008 | Branson et al. | 709/231 |
| 2008/0291863 A1 | 11/2008 | Agren | |
| 2009/0003436 A1 | 1/2009 | Levin et al. | |

OTHER PUBLICATIONS

U.S. Appl. No. 12/130,034, filed May 30, 2008, entitled "Method for Generating a Distributed Stream Processing Application."
U.S. Appl. No. 12/139,651, filed Jun. 16, 2008, entitled "Method for High-Performance Data Stream Processing."
U.S. Appl. No. 12/465,757, filed May 14, 2009, entitled "Profile-Driven Data Stream Processing."
U.S. Appl. No. 12/489,805, filed Jun. 23, 2009, entitled "Pardoning Operator Flow Graphs."
U.S. Appl. No. 12/465,910, filed May 14, 2009, entitled "Dynamically Composing Data Stream Processing Applications."
Abadi et al. The Design of the Borealis Stream Processing Engine, Proceedings of the 2005 CIDR Conference.
Beynon et al., DataCutter: Middleware for Filtering Very Large Scientific Datasets on Archival Storage Systems, Proceedings of the 8th Goddard Conference on Mass Storage Systems and Technologies/17th IEEE Symposium on Mass Storage Systems, College Park, MD, Mar. 2000.
Caltech. Sensing and Responding: Mani Chandy's biologically inspired approach to crisis management. ENGenious—Caltech Division of Engineering and Applied Sciences, Winter 2003.
Reuters Professional—stock market data feed. http://about.reuters.com/productinfo/s/ stock market data feed, Oct. 2007.
Jain et al., Design Implementation, and Evaluation of the Linear Road Benchmark on the Stream Processing Core, International Conference on Management of Data, ACM SIGMOD, Chicago, IL 2006.
MATLAB, http://www.mathworks.com, Oct. 2007.
Upadhyaya et al., Expressing and Exploiting Concurrency in Networked Applications with Aspen, Symposium on Principles and Practice of Parallel Programming, ACM PPoPP, San Jose, CA 2007.
Amini et al., SPC: A Distributed, Scalable Platform for Data Mining, Workshop on Data Mining Standards, Services and Platforms, DM-SSP, Philadelphia, PA 2006.
Carzaniga et al., Design and Evaluation of a Wide-Area Even Notification Service, ACM Transactions on Computer System, 19(3):332-383, 2001.
L. Davidsen, Building an ESB without limits. ftp://ftp.software.ibm.com/software/integration/library/whitepapers/WSW11320-UsEn-00.pdf, May 2007.
Kurc et al., Querying Very Large Multi-dimensional Datasets in ADR, Proceedings of the 1999 ACM/IEEE SC Conference, SC 1999, Portland, OR, Nov. 1999.
Thies et al., Streamlt: A Language for Streaming Applications, International Conference on Compiler Construction, ICCC, Grenoble, France, Apr. 2002.
Vitter, Random Sampling with a Reservoir, ACM Transactions on Mathematical Software, 11:37-57, 1985.
Arasu et al., The CQL Continuous Query Language: Semantic Foundations and Query Execution, Technical Report, InfoLab—Stanford University, Oct. 2003.
Chakravarthy et al., Multiple Query Processing in Deductive Databases using Query Graphs, Proceedings of the 12th International Conference on Very Large Databases, Kyoto, Aug. 1986.
Pauw et al., Streamsight—A Visualization Tool for Large-Scale Streaming Applications, Symposium on Software Visualization, ACM Soft Vis, Herrsching am Ammersee, Germany, 2008.
Hadoop, http://hadoop.apache.org, 2007, pp. 1-2.
Emigh, Morningstar detangles options data, http://www.windowsfs.com/TheMag/tabid/54/articleType/ArticleView/articleId/2185/Morningstar-Detangles-Options-Data.aspx, downloaded Oct. 2, 2008, pp. 1-3.
Wolf et al., SODA: An Optimizing Scheduler for Large-Scale Stream-Based Distributed Computer Systems, Technical Report RC 24453, IBM Research, Dec. 2007.
Tu et al., Load Shedding in Stream Databases: A Control-Based Approach, Very Large Data Bases Conference, VLDB, Sep. 2006.
Arasu et al., STREAM: The Stanford Stream Data Manager, IEEE Data Engineering Bulletin, 26, 2003.
Chandrasekaran et al., TelegraphCQ: Continuous Dataflow Processing for an Uncertain World, Conference on Innovative Data Systems Research, CIDR, 2003.
Energy Information Administration, Electric power industry overview. http://www/eia.doe/gov/cneaf/electricity/page/prim2/toc2.html, Oct. 2007.
IBM WebSphere Front Office for Financial Markets, Version 3.0—WebSphere, http://www.ibm.com/software/integration/wfo, Oct. 2007.
StreamBase Systems http://www.streambase.com, downloaded Oct. 2, 2008, pp. 1.
IBM Unstructured Information Management Architecture (UIMA), http://www.research.ibm.com/UIMA, downloaded Oct. 2, 2008, pp. 1-2.
Wu et al., Challenges and Experience in Prototyping a Multi-Modal Stream Analytic and Monitoring Application on System S. Very Large Data Bases Conference, VLDB, 2007.
Gedik et al., SPADE: The System S Declarative Stream Processing Engine, International Conference on Management of Data, ACM SIGMOD, Vancouver, Canada, 2008.
Leighton et al., Multicommodity Max-flow Min-cut Theorems and their Use in Designing Approximation Algorithms, Journal of the ACM 46(6), 1999, pp. 787-832.
Oracle. http://en.wikipedia.org/wiki/Oracle_machine, downloaded Aug. 5, 2009, pp. 1-4.
Andrade et al., Scale-up Strategies for Processing High-Rate Data Streams in System S, International Conference on Supercomputing, ACM ICS, 2008.
Balakrishnan et al., Retrospective on Aurora, VLDB Journal, Special Issue on Data Stream Processing, 2004.
Coral8, Inc., http://www.coral8.com, May 2007.
IBM DB2. http://www.ibm.com/db2, Oct. 2007.
Gedik et at., CellSort: High Performance Sorting on the Cell Processor, Proceedings of the Very Large Data Bases Conference, VLDB, 2007.
Gedik, et al., Executing Stream Joins on the Cell Processor, Proceedings of the Very Large Data Bases Conference, VLDB, 2007.
Girod, et al., XStream: a Signal-Oriented Data Stream Management System, Proceedings of the International Conference on Data Engineering, IEEE ICDE, 2008.
IBM General Parallel File System, http://www.ibm.com/system/clusters/software/gpfs, Oct. 2007.
Hulten et al., VFML—a toolkit for mining high-speed time-changing data streams, http://www.cs.washington.edu/dm/vfml/, 2003.
IBM, Celll Broadband Engine Architecture and its First Implementation, Technical Report Version 1.0, IBM Systems and Technology Group, 2005.
Intel. IXP2400 Network Processor Hardware Reference Manual. Technical report, Intel Corporation, May 2003.
Liu et al., Use of OWL for describing Stream Processing Components to Enable Automatic Composition, In OWL: Experiences and Directions, OWLED, 2007.
Jacques-Silva et al., Towards autonomic fault recovery in System S. In Proceedings of the International Conference on Autonomic Computing, ICAC (2007).

(56) References Cited

OTHER PUBLICATIONS

Lofar. http://www.lofar.org/, Jun. 2008.
Lois. http://www.lois-space.net/, Jun. 2008.
Olston et al., Pig Latin: A not-so-foreign language for data processing. In Proceedings of the International Conference on Management of Data, ACM SIGMOD (2008).
Publish/Subscribe. http://en.wikipedia.org/wiki/Publish/subscribe, downloaded Aug. 5, 2009, pp. 1-4.
XEP-0060: Publish-Subscribe: http://xmpp.org/extensions/xep-0060.html, downloaded Aug. 5, 2009, pp. 1-4.
Roman et al.,Davidyuk et al., An algorithm for task-based application composition. Dynamic Application Composition—Customizing the behavior of an active space, downloaded Apr. 13, 2009, pp. 1-8.
Davidyuk et al., An algorithm for task-based application composition, in Proc. of the 11th IASTED Int. Conference on Software Engineering and Applications (SEA07), Nov. 19-21, 2007.

\* cited by examiner

| Algorithm 1 Recover OP $RF$ ($f$, $g$) from unfused PE. |
|---|
| 1. Run the PE application at different source rates.<br>2. For all rates, read PE CPU fraction $u_e$ from Linux; Read all input ports data rate vector $\mathbf{r}^r$, tuple rate $\mathbf{t}^r$, and output ports data rate $\mathbf{r}^s$, tuple rate $\mathbf{t}^s$ from SPADE.<br>3. Find the least square polynomial fitting function $f_e$ for data tuples ($\mathbf{t}^r$, $u_e$).<br>4. Find rate function g for I/O tuple rate ($\mathbf{t}^r$, $\mathbf{t}^s$) using least square polynomial fitting for each output port.<br>5. Compute the overhead function $\sum_{i \in I} u^r(r_i^r, t_i^r) + \sum_{i \in O} u^s(\mathbf{g}^i(\mathbf{r}^r)^T, \mathbf{g}^i(\mathbf{t}^r)^T)$ using Equations 1-2 and get the OP $RF$ by $f = f_e - (u^r + u^s)$. |

FIG. 3B

| Algorithm 2 Recover OP $RF$ ($f$, $g$) from fused PE. |
|---|
| 1. Run the PE application at different source rates.<br>2. For all rates, read PE CPU fraction $u_e$ from Linux. Read each fused OP $k$'s CPU fraction $u_k$, input port data rates $r_k^r$, tuple rates $t_k^r$, and output ports data rates $r_k^t$, tuple rates $t_k^t$ from SPADE.<br>3. for each operator $k \in K_e$ do<br>4:     Find the least square linear fitting function $f_{e,k}$ for data tuples ($r_k^r$, $u_e$).<br>5.     Compute the saturated rate $\tilde{r}$ where $f_{e,k}(\tilde{r}) = 1$.<br>6.     Compute rate $RF$ as $g = \dfrac{t_k^s}{t_k^r}$.<br>7.     Find the least square quadratic fitting function $\tilde{f}_k$ for data tuples ($t^r$, $u_k$).<br>8.     Compute the saturated rate point ($\tilde{r}, \tilde{f}_k(\tilde{r})$).<br>9.     Recover the OP CPU $RF$ as $f_k = \dfrac{\tilde{f}_k(\tilde{r})}{\tilde{r}} r_k^r$<br>10. end for |

APPLICATION RESOURCE MODEL COMPOSITION FROM CONSTITUENT COMPONENTS

CROSS-REFERENCE TO RELATED APPLICATIONS

This application is a continuation of U.S. patent application Ser. No. 12/466,017, filed on May 14, 2009, and incorporated by reference herein.

GOVERNMENT CONTRACT

This invention was made with Government support under Contract No.: H98230-07-C-0383, awarded by the United States Department of Defense. The Government has certain rights in this invention.

FIELD OF THE INVENTION

Embodiments of the invention generally relate to information technology, and, more particularly, to data stream processing.

BACKGROUND

As the world becomes ever more information-centric, we are entering an era in which it is necessary to process large volumes of heterogeneous data in near-real-time, in order to make effective decisions and maintain a competitive advantage. Traditional offline-based models of information processing and decision support are not effective here, and there has been an increasing interest in systems that process data "on-the-fly," also known as data stream processing systems.

One task important in the use of such data stream processing systems is the task of effectively and efficiently composing an application (e.g., comprised of one or more computer programs for performing some function) used to process the data stream. This task is made more difficult by the fact that it may be unclear or unknown what resources will be consumed by the application when executed.

SUMMARY

Principles and embodiments of the invention provide techniques for composing an application resource model in a data stream processing system. The application resource model may be used to understand what resources will be consumed by an application when executed by the data stream processing system.

For example, in one aspect, an exemplary method (which may be computer-implemented) for composing an application resource model for a data stream processing system comprises the steps of obtaining one or more operator-level metrics from an execution of a data stream processing application in accordance with a first configuration by learning a communication overhead function associated with communication between two or more processing elements, wherein the application is executed by one or more nodes of the data stream processing system and the application is comprised of one or more processing elements that are comprised of multiple operators, wherein two or more of the multiple operators are combined in a first combination to form a processing element, and wherein the first combination of operators is in accordance with the first configuration, generating one or more operator-level resource functions from the first combination of operators in accordance with the first configuration based on the obtained one or more operator-level metrics, and generating a processing element-level resource function using the one or more generated operator-level resource functions to predict a model for the processing element formed by a second combination of two or more of the multiple operators, the processing element-level resource function representing an application resource model usable for predicting one or more characteristics of the application executed in accordance with a second configuration.

Furthermore, one or more embodiments of the invention or elements thereof can be implemented in the form of a computer product including a tangible computer readable storage medium with computer usable program code for performing the method steps indicated. Still further, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 3A depicts a methodology for recovering operator-level resource functions from an unfused processing element according to an embodiment of the invention.

FIG. 3B depicts a methodology for recovering operator-level resource functions from a fused processing element according to an embodiment of the invention.

DETAILED DESCRIPTION

In data stream processing systems, data is seen as arriving in continuous flows (streams) such as, by way of example only, stock and options trading data in financial systems, environmental sensor readings, satellite data in astronomy, and network traffic state or statistics. The application (e.g., comprised of one or more computer programs for performing some function) processing the data is organized as a data flow graph with processing elements (PE) as the nodes and data streams between the PEs as directed edges in the graph. A PE is comprised of one or more operating system threads that carry out the processing logic of that PE. PEs are deployed onto the physical nodes of a distributed compute cluster, which is shared among multiple applications. The volume of data and the desired analytics combine to yield a situation where the cluster capacity is typically oversubscribed. Hence, performance, scalability, and efficient use of available resources are key considerations in such systems.

By way of example only, assume that streaming data is received by a data processing (data streaming) system. The data processing system then processes this data in accordance with the application domain that the system supports. For example, consider a healthcare domain scenario. A PE of the data processing system may accept as input a stream of blood-pressure readings (streaming data) and generate (based on its associated processing logic) one or more pre-hypertension alerts. Of course, the output of a PE can be used as an input to another PE, creating an arbitrary complex workflow of PEs, with elements from the streaming data flowing between these PEs. It is to be understood that this is only one straightforward example, and thus principles of the invention are not intended to be limited to the healthcare domain or this specific example.

Resource allocation in streaming systems requires accurate prediction of resource consumption by the PEs. A key challenge is how to obtain the resource consumption profile of PEs, especially when the PEs may have not been run (i.e., executed) before, or run on different hardware. In streaming systems, the pre-runtime stage can be critical because the application compiler itself uses such usage profiles to determine how the processing elements should be composed from more basic streaming and non-streaming operations. Runtime generally refers to the period of duration of execution of a computer program such as an application, i.e., from the beginning to the termination of execution of the computer program.

In accordance with illustrative principles of the invention, information available before the runtime is used to create a resource usage profile. Suppose the PE is constructed as a composition of more basic but well known operations, using a predefined and well-defined composition language. In this case, we can systematically construct resource profiles of the basic operators, and combine them to obtain the PE profile. Illustrative embodiments of the invention provide techniques for carrying out such composition in order to get accurate composed profiles. Such a composition methodology and framework enables both: (a) the offline compilation step to generate optimal divisions of the core operations into PEs, and (b) the runtime scheduling step to properly schedule the full set of PEs when some subset of the PEs has not been seen before.

Accordingly, illustrative embodiments of the invention provide techniques for the construction of quantitative resource models of streaming computations. Building quantitative resource models provides a key input for dynamic intelligent resource management. Such resource management decisions include which jobs are admitted into the system, the placement of admitted PEs onto the compute nodes, and the share of node resources received by a PE. These decisions should ensure effective use of available resources without overloading individual nodes or network links and may simultaneously have to respect a number of user-provided constraints such as restricting PEs to a subset of nodes, license availability, and memory footprint. At its core, this is a highly complex bin-packing and flow balance problem in which accurate resource usage models (or "sizes") of the PEs are critical to make the appropriate resource management decisions.

Another feature arises from the development environment or compiler point of view. Similar to toolkits in conventional programming systems, developers of streaming applications may compose the application by using existing (or third-party) fine-grained computations, or operators, as building blocks. The operators are organized in a logical dataflow graph. A compiler then assembles the physical PE-level dataflow graph from this logical operator-level graph, through a process called fusion, where multiple operators are combined to form a PE. A key decision is to decide how many, and which operators must be fused together. For example, on a small cluster of powerful nodes, it is desirable to fuse more operators into fewer PEs of larger size, whereas on a larger cluster of weaker nodes, it should preferably have smaller PEs. In order to generate the appropriately optimized code for either scenario, the compiler should know the "sizes" of both operators and the resulting PEs.

Accordingly, illustrative principles of the invention provide methods and systems for constructing quantitative resource models for PEs that are composed of streaming operators. It is to be understood that operators encapsulate the logic of a streaming operation, and multiple operators may be combined (fused) into a PE for more efficient execution.

In one embodiment, an assumption is made that developers will typically perform some calibration activities in order to optimize their application for the target system, especially when the application contains new components. Illustrative techniques of the invention provide that the information from such calibration activities can be used in order to construct the resource profiles, reusing the data as much as possible. Advantageously, this approach allows the calibration data to be collected on different hardware as well as using a different set of PEs. This broadens the applicability of the inventive techniques, and it reduces the need for doing calibration steps since the operator level information can be reused. Given some history, even new applications may be able to be modeled without performing the calibrations.

Illustrative principles of the invention address two inter-related problems in this process. The metrics collected during calibration reflect a particular set of fusion choices. However, the final optimal fusion choice may be different than the one taken in the calibration step. The first problem is how to use calibration data from operators that are fused in one specific way to learn generalizable, reusable per-operator models. The second problem is that of how to utilize these reusable models to obtain the PE-level models for a specific fusion of the operators which may be different than how the operators were fused during calibration. These operator-level and PE-level resource models or "resource functions" are utilized by the runtime as well as compile-time optimization steps mentioned above. Note that compile-time generally refers to the period of duration of compiling a computer program such as an application, i.e., from the beginning to the termination of compilation of the computer program.

Note also that a resource function generally refers to a function or model that characterizes usage or consumption of a resource used to execute a given application, e.g., central processing unit (CPU) usage or input/output rate. Thus, "operator-level resource functions" generally refer to resource functions that characterize usage or consumption of the given resource from an operator-level perspective, while "processing element-level resource functions" generally refer to resource functions that characterize usage or consumption of the given resource from a processing element-level perspective. Examples of operator-level resource functions (OP RFs) are given below and explained in the subsection entitled "Recovering Operator RFs from fused PEs." Examples of processing element-level resource functions (PE RFs) are given below and explained in the subsection entitled "Computing Fused PE RFs from operator RFs."

First, in one embodiment, the method begins with constructing profiles of the computation cost of communication in the system. For every packet (or byte) emitted or received, each operator (and thus, PE) performs some overhead work which consumes CPU resources. A method is described to profile this communication overhead, and for representing the profile in a useful way for the remaining modeling steps.

Second, a specific set of steps are described to build reusable operator specific models from specific fusion of the operators into a PE. This involves removing effects of under-counting or over-counting of the operator metrics, removing the communication overhead, normalizing any node-specific effects (such as special performance boost on certain architectures), and accounting for multi-threading contention and overhead.

Third, a method is described to construct specific predictive models for the fused PEs using the normalized operator models developed in the prior step. This step conceptually reverses some of the effects that were factored out earlier, thus it composes the operator-level resource functions (RFs) and reintroduces the communication overhead, and adjusts for node/hardware-specific performance effects and multi-threading contention.

Figure 1:
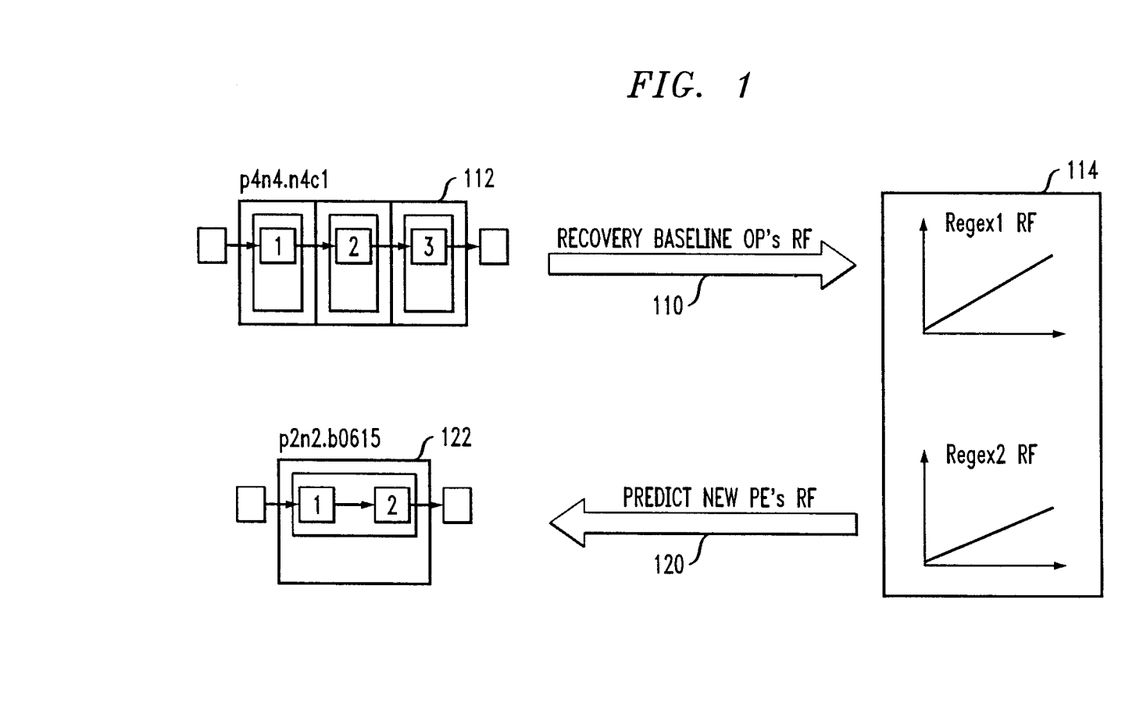
FIG. 1 depicts a methodology for recovering operator-level resource functions and predicting processing element-level resource functions according to an embodiment of the invention.

FIG. 1 depicts two aspects of illustrative principles of the invention. The first, labeled 'Recovering baseline OP RFs' 110 takes metrics data from the particular PE (fusion) 112 used for calibration and develops general operator RFs 114 from it. Note that OP RF stands for operator-level resource functions. This is an example of a step of generating one or more operator-level resource functions based on one or more operator-level metrics obtained from execution of the application in accordance with a first configuration. "Configuration" generally refers to an arrangement of one or more functional and/or physical units, e.g., software, hardware, and combinations thereof. The second aspect, labeled 'Predict New PE RFs' 120 uses the OP RFs 114 to predict the model for a PE formed by a fusion of a possibly different fusion 122 of the OPs. In the example, data is collected from a PE 112 containing OPs 1, 2 and 3 and then used to predict the RF for the PE 122 formed of fusing only OPs 1 and 2. This is an example of the step of generating a processing element-level resource function based on the one or more generated operator-level resource functions, the processing element-level resource function representing the application resource model usable for predicting one or more characteristics of the application executed in accordance with a second configuration.

Figure 2:
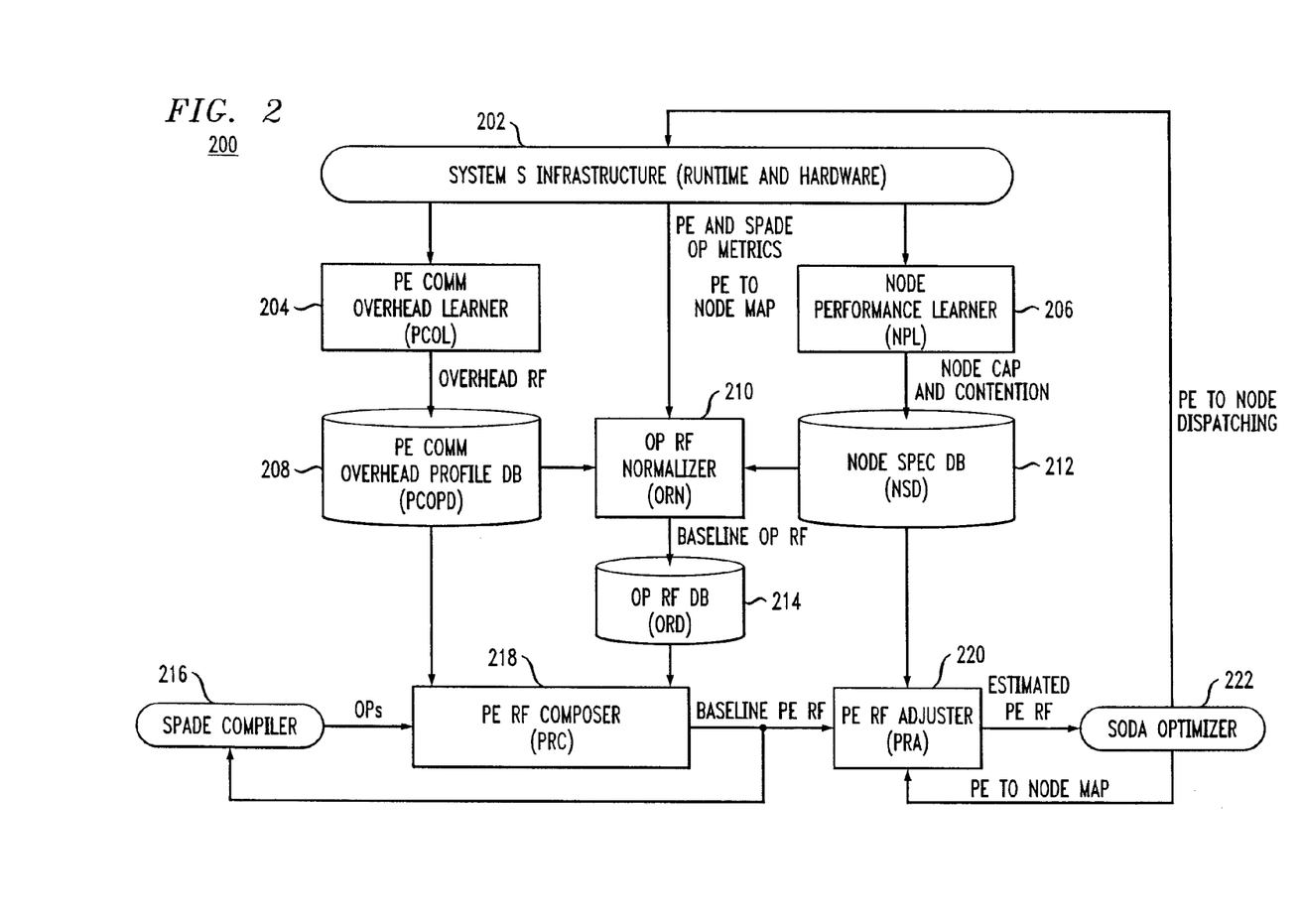
FIG. 2 depicts a system for composing application resource models according to an embodiment of the invention.

An illustrative diagram of a resource modeling framework 200 is shown in FIG. 2, where the components of the resource modeling framework are placed in context with the streaming system. Note that this illustrative embodiment is depicted in the context of a distributed streaming system referred to as System S developed by IBM Corporation of Armonk, N.Y. (see, e.g., L. Amini et al., "A Distributed, Scalable Platform for Data Mining," DMSSP '06, pp. 27-37, NY 2006, the disclosure of which is incorporated by reference herein in its entirety). However, it is to be appreciated that principles of the invention are not limited to implementation in this particular streaming system, and that other suitable streaming system architectures may be employed to implement principles of the invention.

Nonetheless, in System S (generally depicted as System S Infrastructure 202 in FIG. 2), the runtime scheduler 222 is called SODA (see, e.g., Wolf et al., "An Optimizing Scheduler for Large-scale Stream-based Distributed Computer Systems," Middleware '08, December 2008, the disclosure of which is incorporated by reference herein in its entirety), which uses the PE resource models to make its optimal resource allocation decisions. Also, in this illustrative embodiment, the application development is done via a high-level composition language and toolkit known as SPADE (see, e.g., Gedik et al., "Spade: The System S Declarative Stream Processing Engine," SIMOD '08, pp. 1123-1134, NY 2008; and IBM Technical Report No. 24453, J. Wolf et al., "A Scheduling Optimizer for Distributed Applications: A Reference Paper," 2007, the disclosures of which are incorporated by reference herein in their entirety). However, it is to be appreciated that principles of the invention are not limited to use with SODA and SPADE, and that other suitable schedulers and optimizers may be employed to implement principles of the invention.

In accordance with the illustrative embodiments presented here, the SPADE compiler 216 uses the OP and PE level RFs to decide on optimal fusion of the SPADE OPs into System S PEs for the runtime.

For the purpose of calibration, an application is fused in some arbitrary fashion, sufficient to allow it to execute on the system. The description begins from the metrics collected from such an execution. SPADE provides instrumentation to estimate the central processing unit (CPU) fraction spent in each operator of a fused PE. In addition to this, however, we estimate the communication cost of the data (exchanged in units called tuples in SPADE).

Inter-PE Communication Overhead

Note that the CPU overhead for inter-PE communication will vary based on the granularity of data being exchanged. With larger-sized tuples, the overhead-per-byte will be lower. The PE Communication Overhead Learner (PCOL) 204 is the component for estimating this cost function. A simple application is executed comprised of two operators: a Source operator and a Sink operator. Each operator is placed in its own PE, and the size of tuples exchanged is configurable. To estimate the network overhead, the CPU usage of each PE is measured (using the operating system mechanisms/tools such as Unix 'ps' command) when the system is sending as many tuples as possible. In this case, either one or both PEs will saturate their respective CPUs. Data is collected over a variety of tuple sizes. This yields two types of information:

1) CPU fraction of the source and sink at each tuple size; and

2) Maximum data rate (in KB/sec) achieved at each tuple size.

These data are then used to compute the input and output overhead for a particular tuple size and data rate via interpolation as follows:

$$CPU_{inport}(rate_{in}, tuplesize) = CPU_{sink}(tuplesize) * (rate_{in}/maxrate_{in}(tuplesize))$$

$$CPU_{outport}(rate_{out}, tuplesize) = CPU_{source}(tuplesize) * (rate_{out}/maxrate_{out}(tuplesize))$$

This information is stored in a communication overhead profile database 208, for later use by the PE RF composer 218.

Profiling Nodes

To help account for differences in performance of nodes, a node specification database (NSD) 212 is constructed. This database is generated by Node Performance Learner (NPL) 206. Each potential CPU architecture in the cluster is associated with two entries:

1. One entry contains information about the maximum processing rate achieved on that CPU by a pre-defined set of CPU benchmarks (or micro-benchmarks). By normalizing CPUs using this score, it provides a relative performance adjustment factor when converting measurements taken on one node for measurements on another node.
2. The second entry stores a function indicating the speedup obtained as more programs are executed on a particular architecture. For a multi-programming level N, we adjust the RF by multiplying a slowdown factor of $$\frac{speedup(N)}{N}.$$

Recovering Operator RFs from Fused PEs

Given operator metrics from operators in a fused PE, this step constructs normalized operator RFs. This is done in OP RF Normalizer (ORN) 210. This step includes removing effects of under-counting or over-counting of the operator metrics, removing the communication overhead, normalizing any node-specific effects (such as special performance boost on certain architectures), and accounting for multi-threading contention and overhead. The baseline OP RFs are stored in OP RF database (ORD) 214.

The training data for building the OP RFs is obtained by running the application at a range of source rates. Two RFs for each operator are of interest: one for CPU, and another for the output rates. The operator metrics for input and output tuple counts and rates are not subject to the measurement error, so it is possible to directly obtain the output rate RF based on the SPADE profiling metrics. As mentioned above, linear RFs are assumed, which are obtained from the raw metrics data using a linear regression based on the (input_rate, output_rate) data points that go through the origin. However, it is to be understood that the use of a linear model and regression technique is one example. In general, any more complex model can be assumed, and advanced data fitting techniques can be used for obtaining this model.

For the CPU RFs, given the inaccuracy in the OP-level CPU metrics, a two-pronged strategy is employed. First, for an operator which is unfused with others (i.e., it is in a PE by itself), it is possible to use the PE-level metrics to recover the OP-level RF. A procedure to do this recovery is shown in Algorithm 1 of FIG. 3A. Note that the equations referred to in Algorithm 1 in FIG. 3A as Equations 1-2 are as follows:

For a given PE input port with measured input data rate $r^r$ and tuple rate $t^r$, the input port CPU overhead $u^r$ ($r^r$, $t^r$) can be estimated using Equation 1 and the overhead profiling data. In the same way, the output port overhead can be computed by Equation 2:

$$u^r(r^r, t^r) = u_{sink}\left(\frac{r^r}{t^r}\right)\frac{r^r}{r_{max}\left(\frac{r^r}{t^r}\right)} \quad (1)$$

$$u^s(r^s, t^s) = u_{src}\left(\frac{r^s}{t^s}\right)\frac{r^s}{r_{max}\left(\frac{r^s}{t^s}\right)} \quad (2)$$

Note that Algorithm 1 can be executed by OP RF Normalizer (ORN) 210. The PE's communication overhead can be estimated via the PCOL information and subtract it from the PE's CPU usage fraction to obtain the OP's computational CPU usage. The functional RF forms are obtained from this data using a least-squares fit using the lowest order polynomial form that provides good fit. More advanced models and statistical techniques may be used as well. For applications where it is possible to deploy each operator in its own PE, this approach can be used, and it does not need the SPADE profiling metrics (beyond the PCOL information).

For applications with hundreds or thousands of operators, it may not be possible to even deploy or start the application unless the operators are first fused into a more manageable number of PEs. For such operators, the PE level metrics are not very useful. Hence, we rely on the OP-specific metrics collected by the SPADE profiling mechanism. The challenge here is whether the measurement errors introduced by the profiling mechanism can be corrected. This brings us to the second part of the inventive strategy.

It is observed that, at saturation, the SPADE measure will accurately reflect the CPU usage. Hence, in the case of linear RFs, interpolation between the system performance at this saturation point and the origin can be performed to recover the RF. Here, saturation refers to the maximum rate at which the PE can run on this node without other constraints. It is not the maximum ingest rate of the system, which may be limited by other bottleneck PEs. For some PEs, the saturated point is "virtual" if they are not the bottleneck PEs.

In one embodiment, both the PE-level metrics and the SPADE profiling metrics are combined, as shown in Algorithm 2 of FIG. 3B. Note that Algorithm 2 can be executed by OP RF Normalizer (ORN) 210. First, the operator-specific input rate at which the containing PE is saturated is obtained. For each operator k in PE e, first, a functional relationship $u=f_{e,k}(r)$ is obtained between the operator's input rate $r_k^r$ and the PE CPU usage data $u_e$ (step 4). This function is interpolated or projected to find the input rate $\tilde{r}$ where the PE is saturated, i.e., $f_{e,k}(\tilde{r})=1$ (step 5). Then, that operator's SPADE profiling metrics is used (step 7) to find the lowest-order polynomial $u=\tilde{f}_k(r_k^r)$ that best describes the OP-specific data. This operator's correct CPU utilization at the saturated point is given by $\tilde{f}_k(\tilde{r})$ (step 8). Finally, the operator's linear RF is the line between (0, 0) to ($\tilde{r}$, $\tilde{f}_k(\tilde{r})$) (step 9). This approach works well for linear RF operators that are single threaded, non-blocking, and have a single input and output port. Examples include functors and punctors in SPADE. Since functors are usually small operators and are heavily used in most streaming applications for basic data manipulation, such as data filtering, transformation and computation, it is worthwhile to study the fusion case specifically targeted at functor-like operators. The correction method may also work for single-thread blocking operators if the error is in an acceptable range. To illustrate the case, if an operator consumes 60% of the real time at 80% CPU utilization and the rest of time is non-blocking (so 100% utilization for that part), the average CPU utilization measured will be 0.6×0.8+0.4=0.88, which is used by SPADE to approximate the real OP CPU utilization that is 80%. Thus, the SPADE measure will have 10% error when it is used to compute the CPU fraction for that OP.

Note that all the PE measurements used in this step are first adjusted to account for relative node performance as well as multi-threading contention. These adjustments are the inverse of the adjustments discussed below.

Computing Fused PE RFs from Operator RFs

When operators are fused to form PEs (in configurations that may be different than at calibration time), it is necessary to obtain the PE RFs for the resultant PEs. This is done by the PE RF composer (PRC) 218 in FIG. 2.

The PE's I/O RF is obtained by combining the operator RFs via a forward graph traversal from the input ports. For example, consider the PE shown in FIG. 4.

Figure 4:
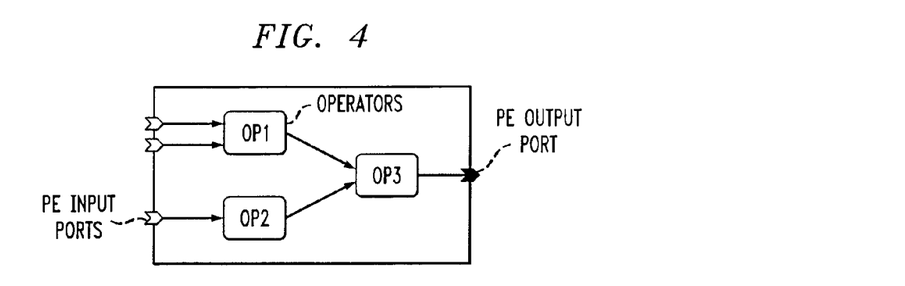
FIG. 4 depicts a processing element according to an embodiment of the invention.

The output rate RF of the PE is $r^s = g(r_1^r, r_2^r, r_3^r)$ whereas OP1 has RF $r_1^s = g_1(r_{1,1}^r, r_{1,2}^r)$, and similarly for OP2 and OP3. The function g can be constructed from $g_1$, $g_2$, $g_3$ by considering that the input ports of OP3 are the output ports of OP1 and OP2. Thus, $$r^s = r_3^s = g_3(r_{3,1}^r, r_{3,2}^r)$$
$$= g_3(r_1^s, r_2^s)$$
$$= g_3(g_1(r_{1,1}^r, r_{1,2}^r), g_2(r_{2,1}^r))$$
$$= g_3(g_1(r_1^r, r_2^r), g_2(r_3^r))$$

In the case where the RFs are linear functions, (that is, $r_1^s = g_1(r_{1,1}^r, r_{1,2}^r) = a_{1,1} r_{1,1}^r + a_{1,2} r_{1,2}^r$ for OP1, and similarly for OP2 and OP3), the composed PE RF is also a linear function:

$$r^s = g_3(g_1(r_1^r, r_2^r), g_2(r_3^r)) = a_{1,1} a_{3,1} r_{1,1}^r + a_{1,2} a_{3,1} r_{1,2}^r + a_{2,1} a_{3,2} r_{1,2}^r$$

Figure 5:
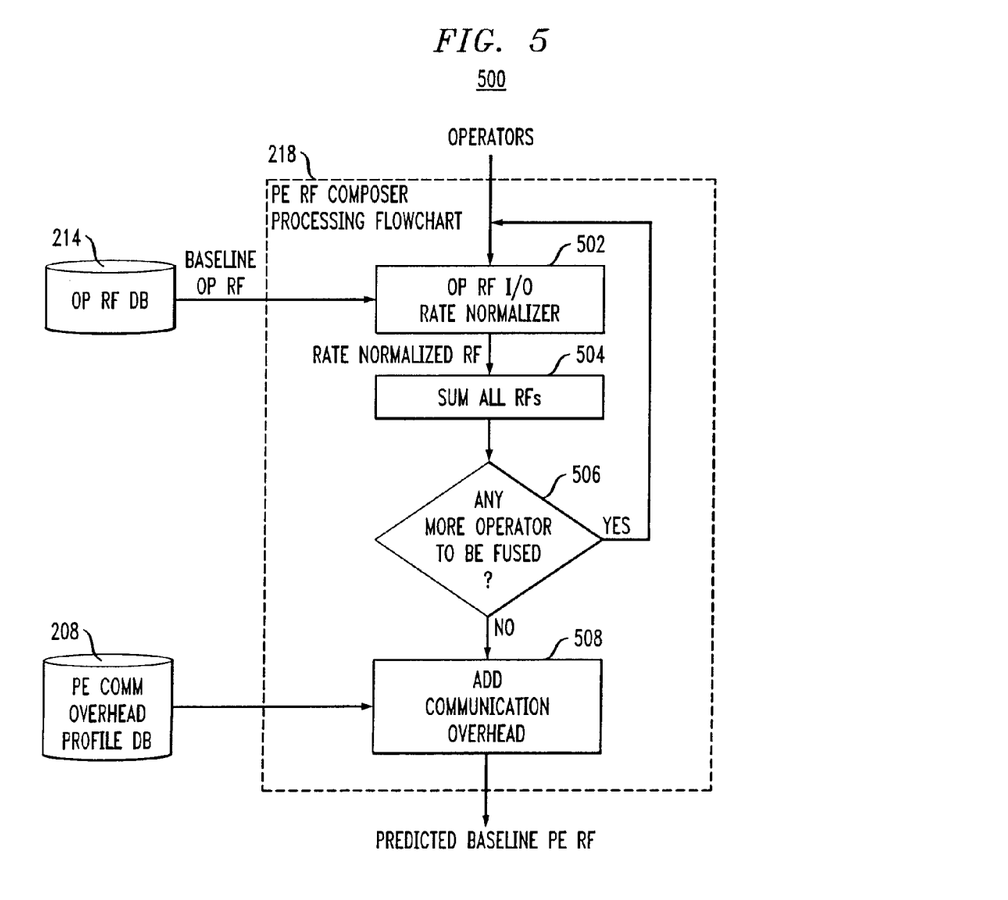
FIG. 5 depicts a methodology for composing operator-level resource functions into processing element-level resource functions according to an embodiment of the invention.

The CPU RF is obtained as shown in FIG. 5 by similarly composing the operators' CPU RFs, but also including the PE communication overhead. That is, methodology 500 performed by PE RF Composer 218 takes as input the baseline OP RF from ORD 214 and the subject operators. The OP RF input/output rate is normalized in step 502 to yield a rate normalized RF. All rate normalized RFs, to this point, are summed in step 504. A check is made, in step 506, whether there are any other operators to be fused. If yes, the methodology returns to step 502 and repeats normalization and then re-sums in step 504. If not, in step 508, communication overhead from PCOPD 208 is added. The result is a predicted baseline PE RF.

The PE RF obtained by methodology 500 is a normalized PE RF that is not adjusted for the specific runtime environment, such as effects of the runtime resource or CPU contention in multi-core or multi-threaded environments. This adjustment is performed by the PE RF adjuster (PRA) 220 as shown in methodology 600 of FIG. 6. This adjustment is comprised of two steps: (1) adjusting for node CPU type (step 602); and (2) adjusting for the multi-threading level (step 604).

Figure 6:
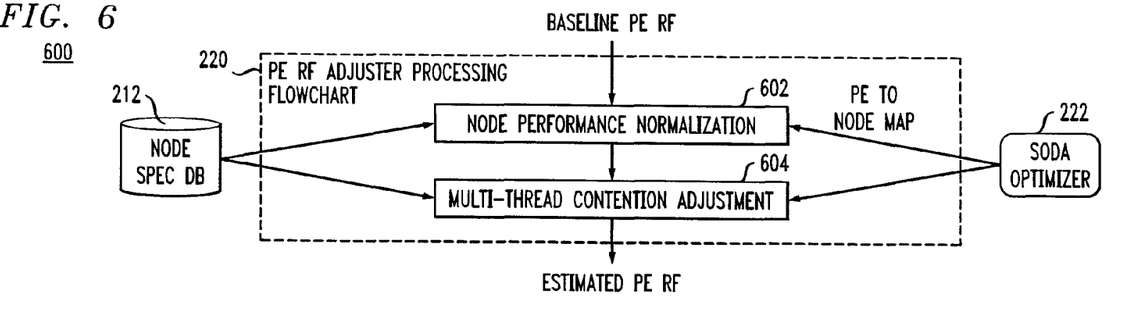
FIG. 6 depicts a methodology for adjusting processing element-level resource functions according to an embodiment of the invention.

Adjusting for CPU Type (Step 602 of FIG. 6)

On different CPUs, the same program can cause different utilizations. An obvious factor is clock speed, even for CPUs of the same architecture. Cross-architecture factors (Intel versus AMD, or x86 versus PowerPC) can cause even larger variations. Illustrative embodiments of the invention propose to associate each potential CPU architecture in the cluster with an entry in the node specification database (NSD) 212 of FIG. 2. Each CPU's entry contains information about the maximum processing rate achieved on that CPU by a predefined set of CPU benchmarks (or micro-benchmarks). Normalizing this maximum data rate yields a performance multiplier factor which is used to adjust the normalized CPU RF obtained above.

Adjusting for Contention (Step 604 of FIG. 6)

Placing multiple PEs on the same node/core may affect the performance if they are sharing caches, memories, and other resources. It is realized that running just two PEs on hyper-threading machines will affect the RFs, but multi-core machines do not show such effects. Accordingly, if the target node for a PE is a multi-threaded architecture, the PE RF should be adjusted. From the NSD 212, we obtain the per-CPU function indicating the speedup obtained as more programs are executed on a particular architecture. For a multi-programming level N, the RF is adjusted by multiplying a slowdown factor of $$\frac{speedup(N)}{N}.$$

It is to be noted that the SODA optimizer 222 provides each step of the PE RF Adjuster 220 with a PE-to-node map for use in making its adjustments.

The techniques, for example as depicted in FIGS. 1, 2, 3A, 3B, 5 and 6, can also include, as described herein, providing a system, wherein the system includes distinct software modules (for example, a PE RF composing module and/or a PE RF adjusting module executing on a hardware processor), each of the distinct software modules being embodied on a tangible computer-readable recordable storage medium. For example, one or more embodiments of the invention may include learning PE RFs from operator-level metrics for a streaming application, where a PE is a deployable software element comprised of one or more streaming operators. It is understood that the PEs are deployable across a set of nodes (for example distributed and/or non-distributed nodes in a multi-core system. In one or more embodiments, the learning step may include learning the communication overhead function, profiling the runtime environment, learning the operator-level resource functions, and composing the PE RF. These steps can be carried out, for example, using a PE RF composer module. The composing step may also include an adjusting step that may be carried out, for example, by a PE RF adjuster module.

Additionally, the techniques, for example as depicted in FIGS. 1, 2, 3A, 3B, 5 and 6, can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
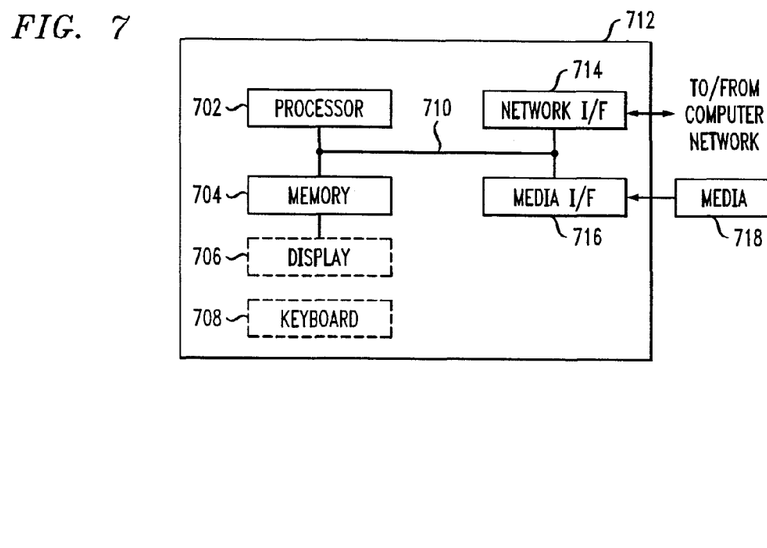
FIG. 7 depicts a computer system that may be useful in implementing one or more aspects and/or elements of the invention.

One or more embodiments can make use of software running on a general purpose computer or workstation. With reference to FIG. 7, such an implementation employs, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 704), magnetic tape, a removable computer diskette (for example media 718), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code can include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 708, display 706, pointing device, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 2. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating highly optimized applications that are tailored to the underlying computing and networking infrastructure.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for composing an application resource model for a data stream processing system, the method comprising steps of:

obtaining one or more operator-level metrics from an execution of a data stream processing application in accordance with a first configuration by learning a communication overhead function associated with communication between two or more processing elements, said communication overhead function based on a maximum rate and a central processing unit usage measured from a benchmark configuration scaled according to a rate and a tuple size for which the overhead is to be computed, wherein the application is executed by one or more nodes of the data stream processing system and the application is comprised of one or more processing elements that are comprised of multiple operators, wherein two or more of the multiple operators are combined in a first combination to form a processing element, and wherein the first combination of operators is in accordance with the first configuration;

generating one or more operator-level resource functions from the first combination of operators in accordance with the first configuration based on the obtained one or more operator-level metrics; and generating a processing element-level resource function using the one or more generated operator-level resource functions to predict a model for the processing element formed by a second combination of two or more of the multiple operators, the processing element-level resource function representing an application resource model usable for predicting one or more characteristics of the application executed in accordance with a second configuration;

wherein the generating steps are executed on a computing system comprising a processor and a memory, wherein one or more software modules for implementing the generating steps are loaded from the memory and executed by the processor resulting in the generation of the application resource model.

2. The method of claim 1, wherein the first configuration of the application is a calibration configuration, and the second configuration of the application is an optimized configuration.

3. The method of claim 1, wherein the first configuration of the application comprises one or more processing elements executed on a first hardware configuration, and the second configuration of the application comprises one or more processing elements executed on a second hardware configuration.

4. The method of claim 1, wherein the one or more predicted characteristics comprise a resource consumption characteristic.

5. The method of claim 1, wherein the operator-level metrics are obtained by profiling a runtime environment associated with the execution of the application in the first configuration.

6. The method of claim 5, wherein the step of profiling the runtime environment further comprises:

learning a processing capacity of each node of the first configuration, wherein a node contains one or more central processing units (CPUs); and learning a scaling factor for CPU usage caused by multi-processing.

7. The method of claim 1, wherein the step of generating one or more operator-level resource functions further comprises:

adjusting for a runtime environment;

computing one or more fitting functions for each operator;

projecting a saturation point of one or more of the processing elements; and deriving an operator-level resource function.

8. The method of claim 7, wherein the step of adjusting for a runtime environment further comprises:

normalizing a central processing unit (CPU) usage according to a specific node capacity; and adjusting the CPU usage according to a specific environment from which the operator-level metrics were obtained.

9. The method of claim 8, wherein the step of adjusting the CPU usage further comprises:

scaling the CPU usage according to a specific target node capacity; and further adjusting the CPU usage to account for a specific environment and node on which the processing element is to be executed.

10. The method of claim 1, wherein the step of generating the processing element-level resource function further comprises:
  summing the resource functions of the operators of a given processing element;
  summing a communication overhead function; and
  adjusting for a runtime environment.

11. The method of claim 1, further comprising the step of using the processing element-level resource function representing the application resource model to predict the one or more characteristics of the application executed in accordance with a second configuration.

12. The method of claim 11, further comprising the step of deploying the application for subsequent execution depending on the one or more predicted characteristics.

13. Apparatus for composing an application resource model for a data stream processing system, the apparatus comprising:
  a memory; and
  a processor coupled to the memory and configured to:
    (i) obtain one or more operator-level metrics from an execution of a data stream processing application in accordance with a first configuration by learning a communication overhead function associated with communication between two or more processing elements, said communication overhead function based on a maximum rate and a central processing unit usage measured from a benchmark configuration scaled according to a rate and a tuple size for which the overhead is to be computed, wherein the application is executed by one or more nodes of the data stream processing system and the application is comprised of one or more processing elements that are comprised of multiple operators, wherein two or more of the multiple operators are combined in a first combination to form a processing element, and wherein the first combination of operators is in accordance with the first configuration;
    (ii) generate one or more operator-level resource functions from the first combination of operators in accordance with the first configuration based on the obtained one or more operator-level metrics; and
    (iii) generate a processing element-level resource function using the one or more generated operator-level resource functions to predict a model for the processing element formed by a second combination of two or more of the multiple operators, the processing element-level resource function representing an application resource model usable for predicting one or more characteristics of the application executed in accordance with a second configuration.

14. The apparatus of claim 13, wherein the first configuration of the application is a calibration configuration, and the second configuration of the application is an optimized configuration.

15. The apparatus of claim 13, wherein the first configuration of the application comprises one or more processing elements executed on a first hardware configuration, and the second configuration of the application comprises one or more processing elements executed on a second hardware configuration.

16. The apparatus of claim 13, wherein the one or more predicted characteristics comprise a resource consumption characteristic.

17. A computer program product comprising a tangible non-transitory computer readable recordable storage medium including computer usable program code for composing an application resource model for a data stream processing system, the computer program product comprising:
  computer usable program code for obtaining one or more operator-level metrics from an execution of a data stream processing application in accordance with a first configuration by learning a communication overhead function associated with communication between two or more processing elements, said communication overhead function based on a maximum rate and a central processing unit usage measured from a benchmark configuration scaled according to a rate and a tuple size for which the overhead is to be computed, wherein the application is executed by one or more nodes of the data stream processing system and the application is comprised of one or more processing elements that are comprised of multiple operators, wherein two or more of the multiple operators are combined in a first combination to form a processing element, and wherein the first combination of operators is in accordance with the first configuration;
  computer usable program code for generating one or more operator-level resource functions from the first combination of operators in accordance with the first configuration based on the obtained one or more operator-level metrics; and
  computer usable program code for generating a processing element-level resource function using the one or more generated operator-level resource functions to predict a model for the processing element formed by a second combination of two or more of the multiple operators, the processing element-level resource function representing an application resource model usable for predicting one or more characteristics of the application executed in accordance with a second configuration.

18. The computer program product of claim 17, wherein the first configuration of the application is a calibration configuration, and the second configuration of the application is an optimized configuration.

19. The computer program product of claim 17, wherein the first configuration of the application comprises one or more processing elements executed on a first hardware configuration, and the second configuration of the application comprises one or more processing elements executed on a second hardware configuration.

* * * * *